Patented Feb. 25, 1941

2,232,867

UNITED STATES PATENT OFFICE 2,232,867

PRODUCTION OF ALKINOLS

Walter Reppe and Ernst Keyssner, Ludwigshafen-on-the-Rhine, Germany, assignors, by mesne assignments, to General Aniline & Film Corporation, New York, N. Y., a corporation of Delaware No Drawing. Application August 9, 1938, Serial No. 223,855. In Germany August 27, 1937

10 Claims. (Cl. 260—638)

The present invention relates to the production of alkinols.

We have found that alkinols, i. e. aliphatic alcohols containing triple unsaturated carbon linkages, can be prepared in an extremely simple manner and with very good yields by reacting aldehydes or ketones with acetylene hydrocarbons of the general formula R—C≡CH, wherein R represents hydrogen or the radical of a hydrocarbon, in the presence of catalysts.

The reaction proceeds especially readily at moderately elevated temperatures as for example from 40 to 150° C. It may, if desired, continuously be carried out at ordinary, reduced or increased pressure. When working at superatmospheric pressure, for example at pressures between 2 and 30 atmospheres, it is suitable to apply the acetylene hydrocarbons in dilution with inert gases or vapors, for example nitrogen, hydrogen or carbon dioxide. As starting gas there may also be mentioned the acetylene obtained by the thermal decomposition of hydrocarbons, as for example in the electric arc, which contains up to about 20 per cent of acetylene.

Suitable acetylene hydrocarbons are for example acetylene itself and its homologues such as methyl acetylene and also vinyl and phenyl acetylene. The reaction may be carried out with aliphatic aldehydes of saturated or unsaturated nature and also with cyclic aldehydes as for example benzaldehyde. Suitable ketones are for example acetone and methyl ethyl ketone.

When starting from acetylene itself the reaction may proceed in two directions, either yielding monovalent alcohols (see Equation I) or yielding divalent alcohols (see Equation II)

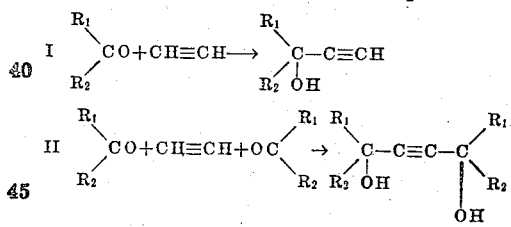

wherein $R_1$ and $R_2$ represent hydrogen or an organic radical.

When starting from substituted acetylene hydrocarbons only monovalent alcohols can be formed (see Equation III)

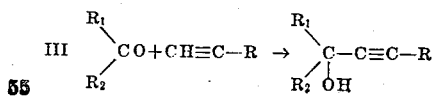

wherein $R_1$ and $R_2$ have the above defined meaning and wherein R represents the radical of a hydrocarbon.

Generally speaking, the reaction is carried out in the liquid phase in the presence of solvents or diluents. Among such there may be mentioned in particular water, alcohols, ethers or mixtures thereof or hydrocarbons. In many cases, especially when starting from aldehydes or ketones which are liquid under the reaction conditions, the solvent or diluent may entirely be dispensed with. The reaction is mostly carried out in weakly acid or neutral reaction, when starting from aldehydes. When starting from ketones the reaction liquid may as well be alkaline. If the reaction liquid be too strongly alkaline, the alkinols formed may again be split to form acetylene hydrocarbon and carbonyl compound. The hydrogen ion concentration, therefore, is advantageously kept between about pH=2.5 and pH=12. If the reaction liquid be too acid, the catalysts are more or less rapidly split with formation of acetylene hydrocarbon so that the yields are rather poor.

As catalysts there are used the heavy metals of the 1st or 2nd group of the periodic system of elements and their compounds, especially their acetylene compounds, in particular copper and its compounds. The reaction may be carried out in the presence of the acetylene compounds of these heavy metals which have been previously prepared; it is also possible to allow these acetylene compounds to be formed in the course of the reaction itself. This may be done, for example, by adding to the starting mixture a heavy metal salt of the kind defined above, for example cuprous or cupric chloride and a compound which is capable of binding the acid which is set free in the formation of the acetylene compound from the metal salt. As substances capable of binding acids there may be mentioned in particular the salts of alkali and earth alkali metals and of magnesium with weak acids, for example the formates, acetates, carbonates and bicarbonates. There may also be used earth alkali metal hydroxides such as calcium or barium hydroxide and other weakly basic substances such as zinc oxide, zinc carbonate, alkali metal phosphates and silicates.

The acetylene compounds of heavy metals of the 1st and 2nd group of the periodic system may be prepared in known manner, for example acetylene may be led through solutions or suspensions of salts of the said heavy metals, for example cupric phosphate and acetate, cuprous or cupric chloride, ammoniacal copper sulphate or silver nitrate or mercury chloride or mixtures of these salts, if necessary in the presence of a compound capable of binding acids. The acetylene compounds of the heavy metals formed are filtered off by suction, freed from remainders of the starting materials by washing with water or organic solvents and used in moist form.

The absorption of acetylene is favored by the addition of substances having large surfaces such as kieselguhr, silica gel or active carbon. These substances may also be impregnated with a solution of the said heavy metal salts. This salt which is absorbed on the active surface may then be treated with acetylene or its monosubstitution products.

The alkinols which may be prepared according to our invention could hitherto only be prepared with difficulty. They are very valuable as intermediate products by reason of their extraordinary reactivity.

The following examples will further illustrate how the invention may be carried out in practice, but the invention is not restricted to these examples. The parts are by weight unless otherwise stated.

Example 1

A catalyst consisting of 1 part of copper acetylide, 0.15 part of silver acetylide and 2 parts of fuller's earth is added to 50 parts of 30 per cent formaldehyde, the whole being treated in a stirring autoclave of alloy steel at 100° C. with a mixture of acetylene and nitrogen in the ratio 2:1 until saturation is reached. The copper acetylene used is prepared from a solution of 5 parts of crystallized copper sulphate in 200 parts of water, 20 parts of 20 per cent ammonia and 15 parts of hydroxylamine hydrochloride by leading in acetylide at room temperature, filtering off and washing with water. The preparation of the silver acetylene is effected in the same way from the solution of 0.2 part of silver nitrate in 50 parts of water and 2 parts of 20 per cent ammonia. The acetylene compounds washed with water are intimately mixed with 2 parts of fuller's earth and water, filtered off and added moist to the formaldehyde. By working up the reaction product by filtering off the catalyst and vaporizing the water, butindiol-1.4 is obtained in a yield of 90 per cent of the theoretical yield together with small amounts of propargyl alcohol.

Example 2

A mixture consisting of 800 parts of acetaldehyde and 400 parts of water has added to it 292 parts of a moist catalyst which contains in addition to water 42 parts of copper acetylide precipitated on 100 parts of fuller's earth. The catalyst has been prepared by leading acetylene into an ammoniacal cuprous chloride solution in the presence of fuller's earth. The whole is then treated in a stirring autoclave of chromium nickel steel with a mixture of nitrogen under 5 atmospheres' pressure and acetylene under 10 atmospheres' pressure, the solution being heated at from 120 to 125° C., until about 100 parts of acetylene are absorbed. This requires about from 20 to 22 hours. The reaction mixture is then filtered off by suction from the catalyst which is washed with about 300 parts of water. Both filtrates are freed from water and unreacted acetaldehyde and the remainder is distilled in vacuo. There are obtained 100 parts of 1.4-dimethylbutin-2-diol-1.4 (boiling at from 110 to 120° C. under a pressure of 2 millimeters mercury gauge) and about 230 parts of butin-3-ol-2 (boiling at ordinary pressure at from 108 to 110° C.). About 270 parts of acetaldehyde are gained back.

Example 3

A mixture of 1000 parts of 94 per cent butyraldehyde and 292 parts of a moist catalyst prepared in the manner described in Example 2 are treated in an autoclave made from chromium nickel steel with a mixture of nitrogen and acetylene in the manner described in Example 2. The reaction is finished after about 36 hours at a temperature from 120 to 130° C. There has been absorbed about half of the theoretical amount of acetylene necessary for the formation of the monovalent alcohol. The reaction is then worked up in the manner described in Example 2. There are obtained about 400 parts of hexin-5-ol-4 (boiling at from 55 to 60° C. under a pressure of 10 millimeters mercury gauge) and 100 parts of 1,4-di-n-propylbutin-2-diol-1,4 (boiling at from 110 to 115° C. under a pressure of 10 millimeters mercury gauge). This corresponds to a yield of about 46 per cent of monovalent alcohol and about 13 percent of divalent alcohol. A preponderating amount of unreacted butyraldehyde may be reclaimed, only a small part thereof is lost by the formation of resinous by-products.

When starting under equal conditions from dodecylaldehyde there is obtained n-tetradekin-13-ol-12 (boiling under a pressure of 1 millimeter mercury gauge at from 182 to 188° C.).

Example 4

1100 parts of oenanthaldehyde are treated with a mixture of nitrogen and acetylene at from 120 to 130° C. for 24 hours in the manner described in Examples 2 and 3. The catalyst used constitutes a precipitation of 45 parts of copper acetylide on fuller's earth which may be prepared by leading acetylene into an ammoniacal cuprous chloride solution in the presence of fuller's earth, filtering off by suction, washing with water until all electrolytes are removed, then washing with dioxane to remove the water and then washing with small amounts of oenanthaldehyde to remove the dioxane.

The reaction mixture is allowed to cool, freed from catalyst and distilled under reduced pressure. There are obtained 150 parts of nonin-8-ol-7 (boiling at from 63 to 64° C. under a pressure of 2 millimeters mercury gauge) and 65 parts of 1,4-di-n-hexylbutin-2-diol-1,4 (boiling at from 170 to 172° C. under a pressure of 1.5 millimeters mercury gauge). About 700 parts of unchanged oenanthaldehyde are reclaimed.

Crotonaldehyde may be reacted in a corresponding manner while using a copper acetylene catalyst which has been freed from water and by washing with crotonaldehyde. There is obtained hexen-2-in-5-ol-4 (boiling at ordinary pressure at from 153 to 154° C.) and 1,4-dipropenylbutin-2-diol-1,4 (boiling at from 103 to 105° C. under a pressure of 1 millimeter mercury gauge).

Example 5

1250 parts of benzaldehyde are treated at from 120 to 130° C. with acetylene in the presence of a catalyst prepared in the manner described in Example 2 for 35 minutes. After working up in the manner described in the foregoing examples there are obtained 105 parts of phenyl-1-propin-2-ol-1 (boiling at from 92 to 93° C. under a pressure of 2 millimeters mercury gauge) as an almost colorless liquid. 900 parts of unchanged benzaldehyde are reclaimed.

Example 6

A mixture of 500 parts of 30 per cent formaldehyde, 500 parts of tetrahydrofurane and 21 parts of copper acetylene catalyst prepared in the manner described in Example 2 are treated in a stirring autoclave with a mixture of nitrogen and acetylene in the manner described in Example 2. The acetylene used up by the reaction is continuously replenished by pressing in undiluted acetylene at from 100 to 105° C. until after about 23 hours two-thirds of the calculated amount of acetylene have been absorbed. The reaction mixture is freed from the catalyst and distilled under ordinary pressure to remove the tetrahydrofurane and part of the water present. It is then distilled under a pressure of from 40 to 50 millimeters mercury gauge, thereby removing propargyl alcohol formed together with further amounts of water. From the residue there may be distilled off in the manner described in Example 1 butindiol-1,4. Sodium carbonate is added to the aqueous solution of propargyl alcohol, whereby the alcohol is separated off as an oil. It is dissolved in ether, the solution dried with sodium carbonate, neutralized and then distilled. Propargyl alcohol is thus obtained in a yield of 59 per cent and butindiol-1,4 is obtained in a yield of 29 per cent which corresponds to a total yield of 88 per cent (calculated on the amount of formaldehyde reacted with acetylene).

Example 7

20 grams of crystallized copper formate are dissolved in 500 cubic centimeters of 40 per cent formaldehyde and 20 grams of freshly precipitated calcium carbonate are added. The resulting mixture is charged into a pressure-tight vessel and treated at from 80 to 100° C. with a mixture of 2 parts of acetylene and 1 part of nitrogen at a pressure of from 15 to 20 atmospheres. The acetylene used up by the reaction is continuously replenished by pressing in undiluted acetylene. After about 12 hours, the theoretically necessary amount of acetylide has been absorbed. The copper acetylide formed during the reaction and the calcium carbonate are then filtered off. The filtrate is distilled in vacuo. After the water present has passed over, the 1,4-butindiol formed by the reaction distils over at from 125 to 127° C. under a pressure of 2 millimeters mercury gauge. This crystallizes in white lustrous small plates. Its melting point is 58° C. The yield is practically quantitative.

Other gases, as for example carbon dioxide, may also be used for dilution instead of nitrogen.

Example 8

40 parts of cuprous chloride and an equal amount of basic magnesium carbonate are suspended in a solution of 2 parts of silver nitrate in 150 parts of water. The suspension is treated in a stirring vessel at 70° C. with acetylene until the original pale yellow color has been converted into a dark red-brown. The mixture obtained, containing copper and silver acetylene compounds, is filtered off by suction, washed with water and added in the moist state to 100 parts of 30 per cent formaldehyde solution. The whole is then treated with a mixture of 1 part of nitrogen and 2 parts of acetylene in a stirring autoclave under a pressure of 20 atmospheres and stirred vigorously at from 90 to 120° C. The acetylene used up is continuously replenished by pressing in undiluted acetylene until the pressure no longer decreases. The reaction mixture is then filtered off by suction from the catalyst and distilled. After having distilled off water and unchanged formaldehyde there is obtained butindiol-1,4 in a yield of 95 per cent which solidifies to a mass of colorless crystals. As a by-product there are obtained small amounts of propargyl alcohol.

The copper acetylide catalyst obtained by filtering the reaction mixture may be used again. If desired it may be admixed with from 5 to 10 parts of basic magnesium carbonate before using it again. Similar results are obtained if basic magnesium carbonate be replaced by zinc oxide, zinc carbonate, lead dioxide, lead carbonates, alkaline metal phosphates, -carbonates or -silicates.

Example 9

A mixture of 40 parts of cuprous chloride and 40 parts of basic magnesium carbonate is suspended, while stirring, in a solution of 2 parts of silver nitrate in 150 parts of water, the suspension being treated with acetylene at 70° C. until the original pale yellow color has been converted into a dark red-brown. The paste thus obtained is brought onto pumice stone and the whole is charged into a reaction tower. The tower is filled with a 30 per cent solution of formaldehyde and acetylene is led in at 100° C. under ordinary pressure. The unchanged acetylene emerging from the reaction tower is led back into the tower in cycle. As soon as acetylene is no longer absorbed, the liquid content of the tower is withdrawn and it is filled again with fresh 30 per cent formaldehyde solution which has been previously neutralized by the addition of a small amount of magnesium carbonate. The solution saturated with acetylene yields, when worked up in the manner described in Example 8, butindiol-1,4.

Example 10

53 parts of 30 per cent formaldehyde solution have added thereto from 3 to 4 parts of the moist catalyst which has been prepared in the following manner: 4.5 parts of 20 per cent aqueous ammonia are added to a solution of 2 parts of crystallized cupric chloride in 100 parts of water. Acetylene is led into the solution thus obtained at ordinary temperature while stirring for 50 minutes. The precipitated cupric acetylide is filtered off by suction and washed out.

The mixture of formaldehyde, catalyst and 0.25 part of calcium carbonate is treated in an autoclave of chromium nickel steel with a mixture of nitrogen and acetylene in the manner described in Example 2. The acetylene used up is continuously replenished by pressing in undiluted acetylene. 5.8 parts of acetylene are thus absorbed at from 100 to 105° C. in the course of 27 hours. The reaction mixture is then freed from catalyst by filtration and the filtrate distilled. There are obtained two parts of propargyl alcohol and 19 parts of butin-2-diol-1,4 which corresponds to a yield of 82 per cent of butindiol and 5 per cent of propargyl alcohol.

Example 11

A solution of 30 parts of cuprous chloride in 20 parts of 20 per cent aqueous ammonia solution is diluted with 2000 parts of water and acetylene is led in while stirring after the addition of 50 parts of fuller's earth. The resulting precipitate which still contains 200 parts of water after washing and filtration, is introduced into a stirring pressure-tight vessel with 880 parts of acetone and 260 parts of 7.7 per cent caustic potash solution. Nitrogen is then pressed in under a pressure of 5 atmospheres and then acetylene under a pressure of 8 atmospheres, the whole being stirred vigorously at from 90 to 100° C. until the pressure no longer decreases. The acetylene used up by the reaction is continuously replenished by pressing in undiluted acetylene. After from about 12 to 15 hours, acetylene is no longer absorbed. The reaction mixture is filtered free from precipitate, washed with acetone and water and carbon dioxide is led into the filtrate for a short time in order to convert any caustic potash still present into potassium carbonate or potassium bicarbonate. Unchanged acetone is removed by distillation at atmospheric pressure, the water is expelled by distillation at from about 60 to 70 millimeters (mercury gauge) and after cooling there is obtained a solid crystal mass which may be purified either by distillation under reduced pressure or by recrystallization from cyclohexane or similar solvents. In this way there are obtained 21 parts of a compound boiling at from 95 to 100° C. under a pressure of 2 millimeters (mercury gauge) which has the constitution

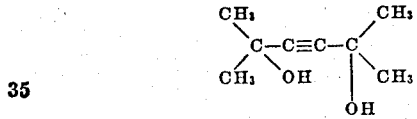

and which melts at 95° C. after recrystallization from cyclohexane.

The aqueous distillate, after separating the small amount of mesityl oxide formed, has potassium carbonate added to it, whereby the methyl butinol formed separates. It is separated, dried with potassium carbonate and purified by distillation. 70 parts of the methyl butinol of the constitution

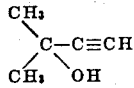

which boils at from 103 to 104° C. are thus obtained.

*Example 12*

250 parts of 40 per cent formaldehyde solution, 10 parts of copper formate and 10 parts of calcium carbonate are charged, after the addition of 75 parts of vinylacetylene, into a pressure-tight vessel and heated for 25 hours at 100° C. after pressing in 10 atmospheres of nitrogen.

The reaction product is filtered free from catalyst and the solution obtained is shaken with ether. After distilling off the ether, the residue is distilled in vacuo. At 1 millimeter pressure (mercury gauge), 1-pentene-3-ine-5-ol passes over between 35 and 40° C. By exhaustive hydrogenation, normal amyl alcohol may be obtained therefrom.

If the same amount of methylacetylene be used instead of vinylacetylene, alpha-methylbeta-hydroxymethylacetylene having a boiling point of from 117 to 120° C. is obtained.

*Example 13*

75 parts of vinyl acetylene, 10 parts of crystallized copper formate and 10 parts of calcium carbonate are heated with 75 parts of acetaldehyde in a pressure-tight vessel for 20 hours at from 80 to 90° C. after pressing in 20 atmospheres of nitrogen.

The reaction mixture is filtered free from catalyst. The excess of acetaldehyde is distilled off from the filtrate. A brown colored oil is thus obtained. By distilling at a pressure of 10 millimeters (mercury gauge), 1-hexene-3-ine-5-ol passes over between 57 and 60° C. By exhaustive hydrogenation, beta-hexanol is obtained therefrom.

What we claim is:

1. A process for the production of alkinols which consists in causing a carbonyl compound selected from the class consisting of aldehydes and ketones to react in the liquid phase with acetylene hydrocarbons corresponding to the general formula R—C≡CH, wherein R stands for a member of the group consisting of hydrogen and hydrocarbon radicles in the presence of an acetylide of a metal selected from the class consisting of the metals of group Ib of the periodic system and mercury.

2. A process for the production of alkinols which consists in causing a carbonyl compound selected from the class consisting of aldehydes and ketones to react in the liquid phase with acetylene hydrocarbons corresponding to the general formula R—C≡CH, wherein R stands for a member of the group consisting of hydrogen and hydrocarbon radicles in the presence of an acetylide of a metal selected from the class consisting of the metals of group Ib of the periodic system and mercury, which acetylide is formed within the reaction mixture from a compound of said metal.

3. A process for the production of alkinols which consists in causing a carbonyl compound selected from the class consisting of aldehydes and ketones to react in the liquid phase with acetylene hydrocarbons corresponding to the general formula R—C≡CH, wherein R stands for a member of the group consisting of hydrogen and hydrocarbon radicals in the presence of copper acetylide.

4. A process for the production of alkinols which consists in causing an aliphatic aldehyde to react in the liquid phase with acetylene hydrocarbons corresponding to the general formula

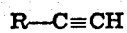

wherein R stands for a member of the group consisting of hydrogen and hydrocarbon radicals in the presence of copper acetylide.

5. A process for the production of alkinols which consists in reacting acetylene in the liquid phase with an aliphatic aldehyde in the presence of copper acetylide.

6. A process for the production of alkinols which consists in leading acetylene through a solution of an aliphatic aldehyde in the presence of copper acetylide.

7. A process for the production of alkinols which consists in leading acetylene diluted with an inert gas through a solution of an aliphatic aldehyde in the presence of copper acetylide.

8. A process for the production of alkinols which consists in leading acetylene diluted with an inert gas through a solution of an aliphatic aldehyde in the presence of copper acetylide under superatmospheric pressure.

9. A process for the production of alkinols which consists in causing a carbonyl compound selected from the class consisting of aldehydes and ketones to react in the liquid phase at temperatures between 40 and 150° C. with acetylene hydrocarbons corresponding to the general formula: R—C≡CH, wherein R stands for a member of the group consisting of hydrogen and hydrocarbon radicals in the presence of an acetylide of a metal selected from the class consisting of the metals of group Ib of the periodic system and mercury.

10. A process for the production of alkinols which consists in reacting acetylene in the liquid phase with an aliphatic ketone in the presence of copper acetylide.

WALTER REPPE.
ERNST KEYSSNER.